3,347,617
PROCESS FOR OPTICALLY BRIGHTENING, DYEING OR PRINTING FIBROUS MATERIALS
Paul Ulrich, Basel, Gerd Hoelzle, Liestal, Peter Stahel, Riehen, and Heinz Peter Schaub, Basel, Switzerland, assignors to Ciba Limited, Basel, Switzerland, a company of Switzerland
No drawing. Filed Nov. 9, 1965, Ser. No. 507,041
Claims priority, application Switzerland, Nov. 13, 1964, 14,697/64
20 Claims. (Cl. 8—42)

The present invention is based on the observation that fibrous materials, especially textile materials, for example, fibres, filaments, flocks, woven fabrics and knitted fabrics, can be dyed, optically brightened or printed fast to washing when the material is treated in the presence of alkaline reacting substances, if necessary, at an elevated temperature, with fluorescent brighteners or dyestuffs that contain one or more reactive hydrogen atoms preferably bound through nitrogen, oxygen or sulphur atoms or that are capable of forming one or more such hydrogen atoms during the dyeing or printing process and that do not contain fibre-reactive groupings, and with quaternary hydrazine compounds not having dyestuff character and that correspond to the formula (1) 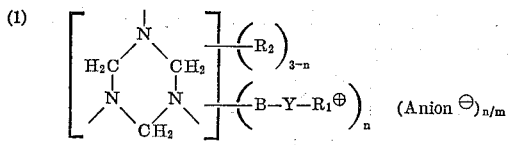   $(\text{Anion}^\ominus)_{n/m}$ in which Y represents an aliphatic bridging group containing a carbon chain of which one carbon atom is bound to B and another is bound to $R_1$, B represents an acidifying substituent, $R_2$ represents a low-molecular alkenyl or halogenated alkyl group bound through an —$SO_2$— or a —CO— bridge, $R_1$ represents a non-aromatic hydrazine residue containing a quaternary nitrogen atom bound directly to Y and in which residue the quaternary nitrogen atom is bound to its substituents by single bonds, the ring containing the quaternary nitrogen atom being of saturated character in cyclic compounds, n is 1, 2 or 3, m is the valency of the anion and the anion$^\ominus$ is the negative residue of a monobasic or polybasic acid.

The new process is eminently suitable for dyeing or printing textile materials made from natural and/or regenerated cellulose, but it is also suitable for textile materials made from polyacrylonitrile or copolymers of acrylonitrile and other vinyl compounds, or for textile materials made from linear polyesters, for example, polyethylene glycol terephthalate or polyesters based on terephthalic acid and para-dimethylol-cyclohexane, as well as for natural and synthetic polyamide fibres, for example, silk, wool, polyhexamethylene-adipic acid amide (nylon), polyaminoundecanoic carboxylic acid amide (Rilsan), paper and leather.

The alkaline reacting substances used are preferably inorganic substances, especially alkali metal hydroxides or carbonates, for example, sodium hydroxide, potassium hydroxide, sodium carbonate, sodium silicate, trisodium phosphate or potassium carbonate. However, it is also possible to use compounds that are converted into substances having a stronger alkaline action under the normal conditions obtaining during dyeing or printing, for example, alkali metal bicarbonates, for example, sodium or potassium bicarbonate, as well as dialkali metal phosphates, for example, disodium phosphate. It is also possible to use mixtures of two or more alkaline substances. Use may also be made of organic bases, for example, trimethylbenzylammonium hydroxide, or compounds that yield dissociation products having a basic reaction only when heated, for example, sodium trichloroacetate.

Suitable dyestuffs are azo dyestuffs, for example, mono-, dis- or poly-azo dyestuffs, metal-complex dyestuffs, anthraquinone, azomethine, triphenylmethane, oxazine or dioxazine dyestuffs or tetrazaporphin, for example, phthalocyanine dyestuffs, and suitable fluorescent brighteners are fluorescent compounds of the stilbene, benzimidazole, benzoxazole or benzthiazole series. In the process of the invention it is also possible to use mixtures of two or more dyestuffs.

The dyestuffs of the kind defined and the fluorescent brightening agents to be used in the process of the invention contain one or more reactive hydrogen atoms preferably bound through nitrogen, oxygen and/or sulphur atoms, for example, in the form of primary or secondary amino groups, sulphonic acid amide groups, sulphonic acid alkylamide groups, for example, of the kind having low-molecular alkyl residues, sulphonic acid arylamide groups, for example, sulphonic acid anilide groups, carboxylic acid amide groups, carboxylic acid alkylamide groups, for example, of the kind having low-molecular alkyl residues, hydroxyl groups and/or sulphhydryl groups, but they are free from fibre-reactive groups (for example, sulphatoethylsulphone, sulphato or halogenethyl sulphamide, β-sulphato or β-halogenpropionyl, acrylic, halogenpyrimidyl or halogenated triazine groups, halogenated quinazoline or quinoxaline groups, 2-halogenated benzthiazole or halogenated pyridazone groups and the like). Of special technical interest are those dyestuffs that contain one or more reactive hydrogen atoms in the form of sulphonic acid amide groups, for example, dyestuffs containing $H_2N-SO_2-$, $HO-CH_2-CH_2-NH-SO_2-$ and/or $H_3C-NH-SO_2-$ groups, advantageously dyestuffs of the kind defined free from sulphonic acid groups that contain one atom of chromium or cobalt bound in complex union with two monoazo dyestuff molecules.

The term "fluorescent brighteners or dyestuffs containing one or more reactive hydrogen atoms" is intended to indicate that the brighteners and dyestuffs of the kind defined contain one or more active hydrogen atoms that enable them to enter into the so-called Michael addition reaction.

The new process is suitable for the application of both dyestuffs and brighteners that are free from groups imparting solubility in water as well as water-soluble dyestuffs. The water-soluble dyestuffs generally contain one or more sulphonic acid and/or carboxyl groups as groups imparting solubility in water. In the process of the invention it is advantageous to use dyestuffs containing one or more sulphonic acid amide or sulphonic acid alkylamide groups, for example, sulphonic acid-(β-hydroxyethyl)-amide or sulphonic acid methylamide groups as groups imparting solubility in water. The dyestuffs used may be substantive dyestuffs, but they must not be so-called reactive dyestuffs, that is to say, dyestuffs capable of being fixed to the substratum to be dyed or printed by a chemical bond. In the case of substantive dyestuffs, the new process improves the properties of fastness of the dyeings and prints.

The quaternary hydrazine compounds of the Formula 1 do not have dyestuff characteristics and must thus be incapable of colouring the substratum, nor must they possess distinct colour of their own. They comprise the residue of the formula

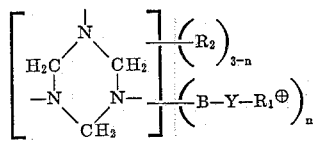

and $n/m$ anions having the valency $m$.

In the above formula Y represents an aliphatic bridging group between B and $R_1$ and contains a chain of at least two carbon atoms. This carbon chain is bound to B and $R_1$ through two different carbon atoms; the said two carbon atoms are advantageously two neighbouring carbon atoms that may also carry substituents, for example, alkyl groups. The simplest kind of bridging group represented by Y corresponds to the formula

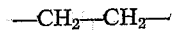

The symbol B in the Formula 1 represents an acidifying substituent whose constitution may differ widely. For example, B may represent a carboxylic acid amide group bound to Y through its carbon atom. However, B is advantageously a —CO— or an —$SO_2$— bridge.

The residue $R_2$ may be unsaturated or saturated. The principal unsaturated residues that may be mentioned are the vinylsulphone residue, acrylic residues (for example chloracrylic, bromacrylic, and the unsubstituted acrylic residue itself) and crotonyl residues, for example, the chlorocrotonyl residue. Saturated low-molecular alkyl residues represented by $R_2$ that may be mentioned are, for example, the residue of the formula

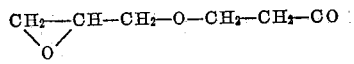

and the β-chloropropionyl as well as the β-bromopropionyl residue.

The hydrazine reside $R_1$ in the Formula 1 contains a quaternary nitrogen atom which is directly bound to the bridging group Y and which also satisfies the conditions indicated above. Therefore, $R_1$ may be, for example, the residue of a tertiary non-aromatic hydrazine, hence, for example, the residue of an aliphatic, cycloaliphatic or heterocyclic hydrazine. One of the two nitrogen atoms of a hydrazine grouping of the kind defined must, as tertiary nitrogen atom, be bound to two carbon atoms. The other nitrogen atom may be substituted or unsubstituted. Cyclic hydrazine compounds may also be considered, especially those in which one or both of the hydrazine nitrogen atoms may be members of one or more than one ring.

In addition to one or a plurality of hydrazine groups, the residue $R_1$ may contain substituents that do not react with the fluorescent brighteners or dyestuffs to be used, for example, halogen atoms, nitro, alkoxy or hydroxyl groups. Preferably, however, hydrazines are used that contain only carbon and hydrogen atoms in addition to at least one group of the formula >N—N< Group for example, hydrazines containing at least one tertiary nitrogen atom that are substituted exclusively by non-aromatic hydrocarbon residues.

Hydrazines of the kind defined may correspond, for example, to the formula (5) 

in which $R_{11}$ and $R_{12}$ represent aliphatic hydrocarbon residues containing not more than 4 carbon atoms and $R_{13}$ represents a residue of the same kind, an HS—CS— group, an $HO_3S$— group, a group of the formula (6) 

or preferably a hydrogen atom, or in which $R_{14}$ and $R_{15}$, together with nitrogen atom form a ring, preferably a 5-membered or 6-membered ring.

The purely aliphatic hydrazines of the Formula 5 advantageously correspond to the formula (7) 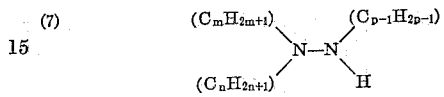

in which $m$ and $n$ each represent an integer not greater than 4, but preferably 1, and $p$ represents an integer not greater than 5. The aliphatic hydrocarbon residues in these hydrazine compounds may be branched but they are preferably unbranched.

Finally, emphasis must be given to those hydrazine compounds in which the nitrogen atoms that are adjacent to each other are at the same time members of two condensed rings, for example, of the formula (8) 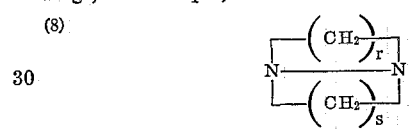

in which $r$ and $s$ may be identical or different and represent the numbers 3 or 4.

The following hydrazines are mentioned as examples: N,N - dimethylhydrazine, N,N-methylethylhydrazine, N-aminopyrrolidine of the formula (8a) 

N-aminopiperidine of the formula (9) 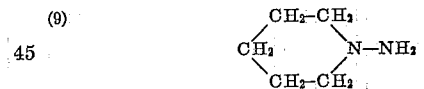

1,5-diaza-bicyclo-(0,3,3)-octane of the formula

(10) 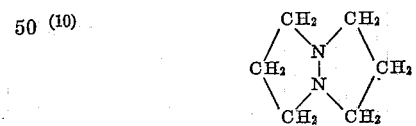

(11) 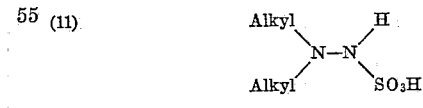

(12) 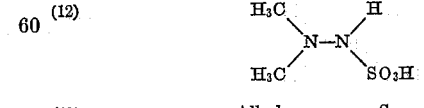

(13) 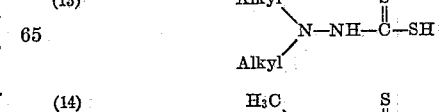

(14) 

(15) 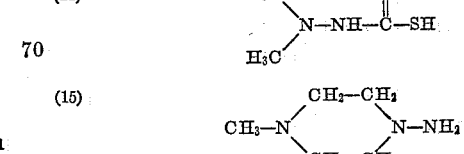

(16) 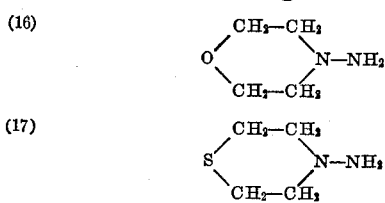

(17)

Specific illustrative compounds employable according to the present invention are

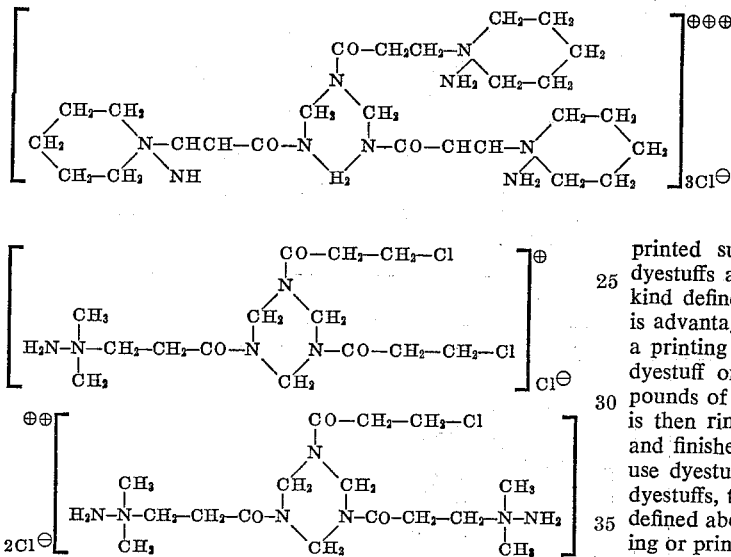

The anion ⊖ may be the negative residue of a monobasic or polybasic, preferably inorganic acid. The residues of the kind defined that are the most important are primarily halogen ⊖, preferably —Cl⊖, —SO$_4$H⊖ or —PO$_4$H$_2$⊖ because they are easily obtainable, but this naturally does not exclude other appropriate residues.

The quaternary hydrazine compounds of the Formula 1 can be prepared by reacting compounds of the formula

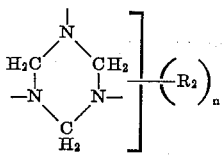

in which R$_2$ and $n$ have the meanings given above, with tertiary hydrazines in a molecular ratio of 1:1, 1:2 or 1:3. Instead of starting from the halogenated compounds, the reaction may also be carried out with the corresponding esters of polybasic inorganic acids.

Quaternary compounds of the Formula 1 that contain an N,N-dialkylhydrazine residue bound to Y are also obtainable by reacting the appropriate tertiary nitrogen bases with chloramine.

In accordance with the process of the invention it is advantageous to use polyfunctional compounds of the Formula 1, that is to say, compounds in which $n$ is at least 1, especially those in which $n$ is 3.

When working according to the new process, fixation of the fluorescent brighteners or dyestuffs on the substratum can be brought about at room temperature, that is to say, at about 15 to 30° C. It is advantageous, however, to fix the dyestuffs in the usual manner, for example, by steaming or by a dry heat treatment at a temperature between 30 and 200° C., preferably between 40 and 150° C., provided the material to be dyed and/or printed permits the use of these temperatures. The duration of the fixing process can vary within wide limits because it depends on the nature of the dyestuff, hydrazine compound, alkaline substance and substratum used and on the temperature at which fixation is carried out; however, it is easily determined by tests. Fixation of dyestuffs or fluorescent brighteners on textile material made of cellulose is advantageously carried out by steaming or a dry heat treatment at 70 to 150° C. and is generally completed within approximately 5 to 10 minutes in this temperature range.

The process of the invention can be carried out by treating the material to be optically brightened, dyed or printed successively with the alkaline substances, the dyestuffs and the colourless hydrazine compounds of the kind defined above in any desired sequence. However, it is advantageous to treat the material in a dyebath or with a printing paste that contains the alkaline substance, the dyestuff or dyestuffs and the colourless hydrazine compounds of the kind defined above. The material so treated is then rinsed in the usual manner, soaped if necessary, and finished in the usual manner. It is also of interest to use dyestuff preparations that contain, in addition to the dyestuffs, the colourless hydrazine compounds of the kind defined above together with dispersing agents and/or dyeing or printing assistants.

The hydrazine compounds may also be used in a state of fine division together with dispersing or wetting agents or as solutions in solvents miscible with water.

In addition to the alkaline reacting substances, dyestuffs and colourless hydrazine compounds, the dyebaths and printing pastes used in the process of the invention may contain the usual dyeing and printing assistants, provided the said assistants do not react in an undesirable manner with the starting materials. Dyeing and printing assistants of the kind defined are, for example, surface-active compounds for example, alkylsulphonates or compounds that prevent migration of the dyestuff, for example, sodium acetate, or substances that improve the solubility and fixation of the dyestuffs, for example, urea, or thickening agents, for example, oil-in-water emulsions, tragacanth thickeners, alginates or methyl cellulose.

As a rule, the dyebaths and printing pastes are applied to the material to be treated by means of a padding mangle or by printing. However, it is also possible to carry out the process of the invention in other kinds of conventional dyeing apparatus, for example, on a jigger, in an open beck, on a winch or in a circulating liquor machine. When treating textile materials made from cellulosic fibres by the new process it is also possible to impart a finish to the material, for example, a crease-resist finish, at the same time as it is being dyed or printed.

In the new process for dyeing, printing or optically brightening textile materials it is advantageous to use 100 parts each of the fluorescent brightener or dyestuff containing one or more reactive hydrogen atoms preferably bound through nitrogen, oxygen or sulphur atoms, approximately 10 to 200 parts of a strong alkaline substance and approximately 20 to 400 parts of colourless hydrazine compound of the kind defined.

The optical brightening effects, dyeings and prints obtainable by the process of the invention are generally distinguished by excellent properties of wet fastness. When using water-soluble dyestuffs it is advantageous to use those having the least possible affinity for the substratum, since it is then easier to wash out any dyestuff that may not have been fixed. Dyeings and prints displaying a remarkably good fastness to rubbing and to solvents are obtained by the process of the invention when using water-insoluble dyestuffs.

The following examples illustrate the invention. Unless otherwise stated, the parts and percentages are by weight. The relationship of parts by volume to parts by weight is the same as that of a litre to a kilogram measured under normal conditions.

*Example 1*

A printing paste having the following composition is prepared: 30 parts of the 1:2 chromium complex compound of the monoazo dyestuff of the formula

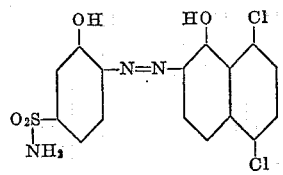

100 parts of urea, 30 parts of the compound of the formula

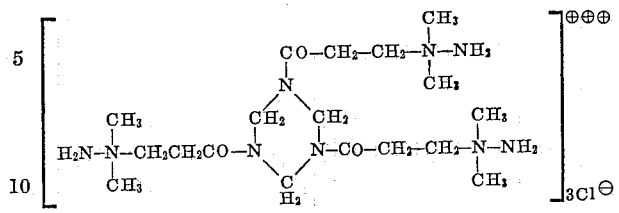

30 parts of 30% sodium hydroxide solution, 400 parts of sodium alginate thickener 60:1000, 410 parts of water.

A cotton fabric is roller-printed with this paste. The material is then dried, steamed for 8 minutes and then vigorously rinsed, first hot and then cold.

A bluish green print which is fast to washing at the boil is obtained.

Similar good results are obtained when the above dyestuff is replaced by any one of the dyestuffs listed in Column I of the following table; Column II indicates the tints obtained.

|   | I | II |
|---|---|---|
| 1 | 1:1 chromium complex compound of the monoazo dyestuff of the formula 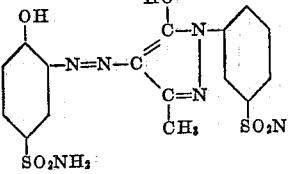 | Orange. |
| 2 | 1:2 cobalt complex compound of the monoazo dyestuff of the formula 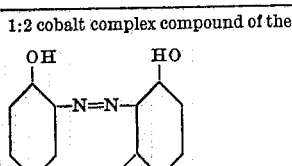 | Red. |
| 3 | 1:2 cobalt complex compound of the monoazo dyestuff of the formula 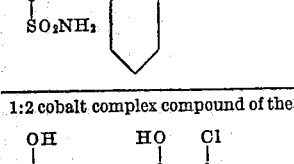 | Claret. |
| 4 | 1:2 chromium-complex compound of the monoazo dyestuff of the formula 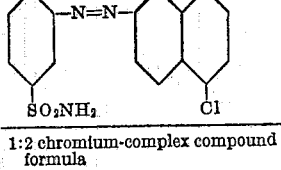 | Blue. |
| 5 | 1:2 chromium complex compound of the monoazo dyestuff of the formula 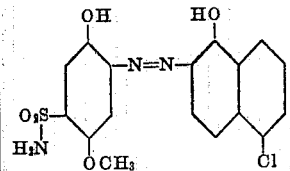 | Yellow. |

| | I | II |
|---|---|---|
| 6 | 1:2 chromium complex compound of the monoazo dyestuff of the formula<br><br>$H_2N-O_2S-$⬡$-N=N-$⬡⬡ with -OH HO- groups | Violet. |
| 7 | 1:2 chromium complex compound of the formula<br><br>(structure showing Cr complex with -N=N-, -SO$_2$NH$_2$, H$_2$N-O$_2$S-, -CH$_3$ groups) | Brown. |
| 8 | [copper phthalocyanine]—(SO$_2$—NH—CH$_2$CH$_2$OH)$_4$ | Blue. |
| 9 | [copper phthalocyanine]—$\left[ SO_2-N\begin{matrix}CH_2-CH_2OH\\CH_2-CH_2OH\end{matrix}\right]_4$ | Blue. |
| 10 | (anthraquinone structure with O, NH$_2$, SO$_3$H, NH-, triazine with NH$_2$ groups) | Blue. |
| 11 | [tetraphenyl copper phthalocyanine]$\begin{cases}(SO_2-NH_2)_3\\(SO_3H)_3\end{cases}$ | Green. |
| 12 | [copper phthalocyanine]$\begin{cases}(SO_2-NH-CH_2-CH_2-OH)_2\\SO_3H\end{cases}$ | Blue. |
| 13 | 1:2 chromium complex compound of the dye of the formula<br><br>(structure with OH, HO, -N=N-, SO$_3$H, H$_2$N-SO$_2$, CH$_3$ groups) | Reddish orange. |
| 14 | 1:2 cobalt-complex compound of the formula 13 | Yellow-brown. |
| 15 | 1:2 chromium complex compound of the formula<br><br>(structure with HO$_3$S, OH, HO, -N=N-, SO$_2$-NH$_2$, Cl, CH$_3$ groups) | Red. |
| 16 | [copper phthalocyanine]$\begin{cases}\left(SO_2-NH-⬡\begin{matrix}NH_2\\SO_3H\end{matrix}\right)_2\\SO_3H\end{cases}$ | Turquoise blue. |

| I | II |
|---|---|
| 17. [nickel phthalocyanine] 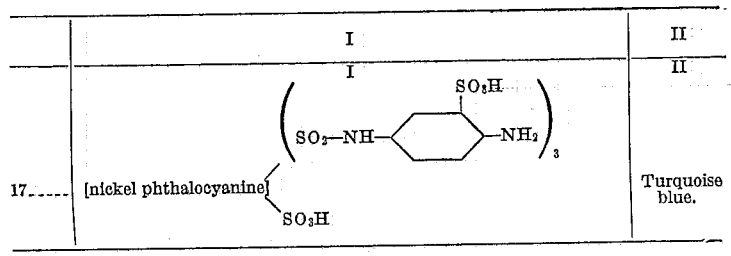 | Turquoise blue. |

Example 2

A cotton fabric is padded with a liquor of the following composition, the liquor uptake being 70%: 30 parts of the 1:2 chromium-complex compound of the monoazo dyestuff of the formula

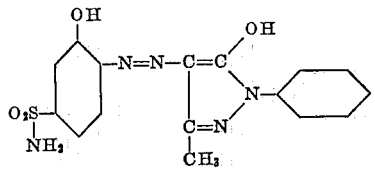

200 parts of urea, 40 parts of the compound of the formula

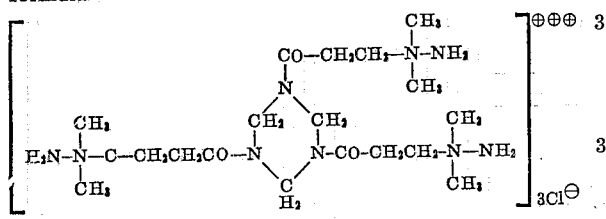

20 parts of sodium carbonate, 710 parts of water.

The padded fabric is dried and then subjected to a heat treatment for 5 minutes at 160° C. It is then thoroughly rinsed, first hot and then cold.

A red dyeing fast to washing at the boil is obtained.

Similar good results are obtained when the above-mentioned hydrazinium compound is replaced by an equal proportion of the compound of the formula

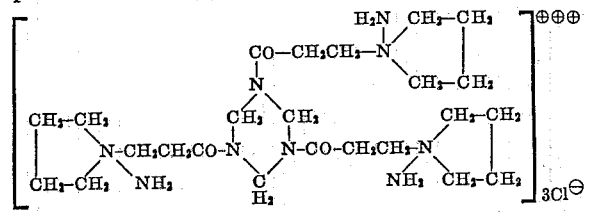

Example 5

A cotton fabric is padded with a liquor having the following composition: 3 parts of the fluorescent brightening agent of the formula

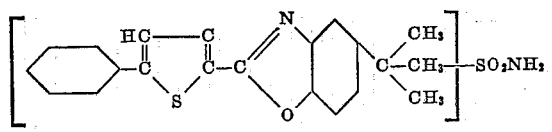

50 parts of urea, 5 parts of the compound of the formula

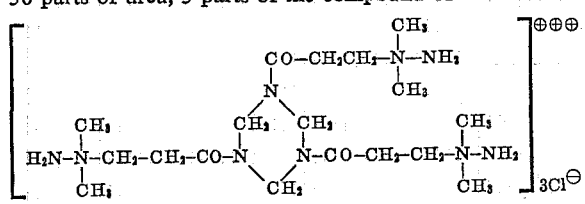

5 parts of sodium carbonate, 937 parts of water.

The padded material is dried, subjected to a heat treatment for 5 minutes at 160° C., rinsed, and then soaped at the boil.

The fluorescent brightening effect so obtained is fast to washing at the boil.

What is claimed is:

1. A process, wherein fibrous material is treated in the presence of an alkaline reacting substance with a compound A selected from the group consisting of a fluorescent brightener and a dyestuff that is free from fiber-reactive substitutents and that contains a member selected from the group consisting of a reactive hydrogen atom and a group capable of forming a reactive hydrogen atom during the process and a compound B which is a colorless polyfunctional hydrazine compound of the formula

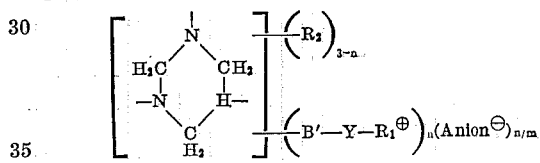

in which Y represents a member selected from the group consisting of a methylene, ethylene and propylene bridging group, B' represents a member selected from the group consisting of an —$SO_2$— and a —CO— bridge, $R_2$ represents a member selected from the group consisting of chloracetyl, acryl, chloracryl, bromacryl, crotonyl, chlorocrotonyl, β-chloropropionyl, β-bromopropionyl, β-(epoxy-2,3-propoxy)propionyl, vinylsulfone, 3-chlorethylsulfone and 3-sulfatoethylsulfone, $n$ is a positive whole number up to 3, $m$ is the valency of the anion and the anion$^\ominus$ is the negative radical of a monobasic or polybasic acid, and $R_1^\oplus$ represents a non-aromatic hydrazine radical of the group consisting of

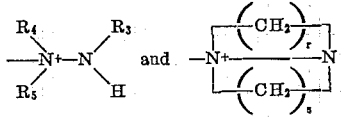

in which $R_4$ and $R_5$ represent aliphatic hydrocarbon radicals containing not more than 4 carbon atoms and $R_3$ represents a member selected from the group consisting of an aliphatic hydrocarbon radical containing not more than 4 carbon atoms, an HS—CS-group, an $HO_3$S-group, a group of the formula

and a hydrogen atom and in which $R_4$ and $R_5$ and $R_6$ and $R_7$ respectively together with the nitrogen atom can form a 5- or 6-membered ring and $r$ and $s$ are numbers not smaller than 3 and not greater than 4.

2. A process as claimed in claim 1 wherein the fibrous material used is a textile material.

3. A process as claimed in claim 1 wherein the fibrous material is treated at an elevated temperature.

4. A process as claimed in claim 1 wherein the compound A contains in the molecule at least one reactive hydrogen atom bound through a nitrogen, oxygen, or sulfur atom.

5. A process as claimed in claim 1, wherein a dyestuff containing a sulphamide group is used.

6. A process as claimed in claim 1, wherein a dyestuff free from sulfonic acid group is used.

7. A process as claimed in claim 1, wherein a 1:2-chromium-complex compound of a monoazo dyestuff is used.

8. A process as claimed in claim 1, wherein a 1:2-cobalt-complex compound of a monoazo dyestuff is used.

9. A process as claimed in claim 1, wherein the radical B′ in the given formula is a —CO— bridge.

10. A process as claimed in claim 1, wherein the radical Y in the given formula is ethylene.

11. A process as claimed in claim 10, wherein $R_1^+$ corresponds to the formula

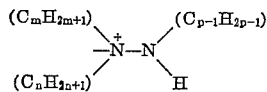

in which $m$ and $n$ each represent an integer not greater than 4 and $p$ represents an integer not greater than 5.

12. A process as claimed in claim 1, wherein $n$ stands for 3.

13. A process as claimed in claim 1, wherein the radical $R_1$ is the radical of a cyclic hydrazine.

14. A process as claimed in claim 1, wherein the radical $R_1$ is the radical of N,N-dimethylhydrazine.

15. A process as claimed in claim 1, wherein the compound A is fixed on the fibrous material by steaming.

16. A process as claimed in claim 1, wherein the compound A is fixed on the fibrous material by a dry heat treatment.

17. A process as claimed in claim 1, wherein the fibrous material is treated successively with the alkaline reacting substance, the compound A and the colorless hydrazine compound in any desired sequence.

18. A process as claimed in claim 1, wherein the fibrous material is treated in the presence of a dispersing agent.

19. A process as claimed in claim 1, wherein 100 parts each of compound A, 10 to 200 parts of a strong alkaline substance and 20 to 400 parts of the hydrazine compound are used.

20. A process as claimed in claim 1, wherein cellulosic fibrous material is treated.

References Cited

UNITED STATES PATENTS 3,190,871  6/1965  Basel _____ 8—1

FOREIGN PATENTS 609,825  4/1962  Belgium.
1,358,724  3/1964  France.
1,362,088  4/1964  France.

OTHER REFERENCES

Ciba, Swiss Auslegeschrift 12534/62, pub. 7/15/64. Only pp. 1–15 are relied upon.

DONALD LEVY, *Primary Examiner.*

UNITED STATES PATENT OFFICE
CERTIFICATE OF CORRECTION

Patent No. 3,347,617                                    October 17, 1967

Paul Ulrich et al.

It is hereby certified that error appears in the above numbered patent requiring correction and that the said Letters Patent should read as corrected below.

Column 12, lines 30 to 35, the formula should appear as shown below:

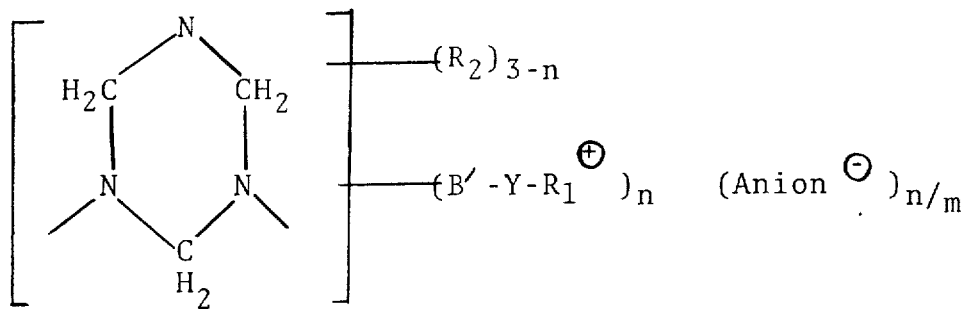

Signed and sealed this 21st day of October 1969.

(SEAL)
Attest:

EDWARD M. FLETCHER, JR.                   WILLIAM E. SCHUYLER, JR.
Attesting Officer                             Commissioner of Patents